Nov. 3, 1931.   H. AUSTIN   1,830,183
MEANS FOR CARRYING SPARE WHEELS OR TIRES
Filed July 21, 1928   4 Sheets-Sheet 3

Nov. 3, 1931.  H. AUSTIN  1,830,183
MEANS FOR CARRYING SPARE WHEELS OR TIRES
Filed July 21, 1928  4 Sheets-Sheet 4

Inventor
Herbert Austin
By
Pennie Davis Marvin & Edmonds
Attorneys

Patented Nov. 3, 1931

1,830,183

UNITED STATES PATENT OFFICE

HERBERT AUSTIN, OF BROMSGROVE, ENGLAND

MEANS FOR CARRYING SPARE WHEELS OR TIRES

Application filed July 21, 1928, Serial No. 294,398, and in Great Britain July 26, 1927.

When one or more spare wheels or tires have been carried at the rear of a motor vehicle, it has been usual either to place them in a vertical position, and sometimes in a suitable receptacle, or else they have been laid along horizontally beneath the rear end of the body and between the chassis frame members. In the former case, if luggage is being carried at the rear of the vehicle, it must be placed upon a luggage grille which is to the rear of the spare wheels or tires, and this necessitates the load being placed undesirably far to the rear. When the spare wheel or tire is laid horizontally there is the inconvenience that a portion of the wheel or tire usually projects unduly far to the rear of the vehicle.

The present invention consists in an arrangement whereby one or more wheels or tires may be carried in the vertical position in cases in which there is no luggage; but can be readily changed to the horizontal position such as when it is desired to carry luggage the latter then being placed on a luggage grille which comes over or partly over the spare wheel or wheels or tire or tires. In this manner the minimum rearward projection is obtained both when travelling without luggage and when travelling with luggage.

According to one form of the invention, two fixed receptacles are provided for a spare wheel or tire, one of these receptacles being substantially horizontal and the other substantially vertical, and they are arranged in such a manner that the one intersects the other; but the vertical receptacle is preferably arranged so that it does not project above the upper surface of the horizontal receptacle, thereby allowing the luggage grille to be placed at such level. When it is not required to carry luggage, the wheel or tire is placed in the vertical receptacle and passes upwards across the plane of the upper surface of the horizontal receptacle the luggage grille then being turned up out of the way. When it is required to carry luggage, the wheel or tire is removed from the vertical receptacle and placed in the horizontal receptacle which intersects the vertical receptacle and the luggage grille is turned down over it. Suitable means are provided for retaining the wheel or tire in the receptacle such means consisting preferably of leather straps secured to the receptacle and arranged so as to be strapped round two or more spokes of the wheel or round the tire.

If desired, each receptacle may be duplicated, that is to say the vertical receptacle may have a second vertical receptacle secured to its back face, and the horizontal receptacle may have a second horizontal receptacle secured to its under face.

According to another modification, there is only a single receptacle in respect of each wheel or tire and such receptacle is pivoted in relation to the rear end of the frame of the vehicle so that it can be turned from a substantially vertical position, in which it will normally be used, to a horizontal position when it is desired to carry luggage. The luggage grille in this case may be pivoted as in the other modification and may be turned up when the receptacle is in the vertical position.

In this modification also the receptacle may be duplicated that is to say it may have a second receptacle secured to what is its rear face when in the vertical position.

In either of the modifications described above the luggage grille may form a part of the receptacle or of the horizontal receptacle in the case where there is a horizontal and vertical receptacle.

In order that the invention may be clearly understood, convenient applications thereof are described with reference to the drawings herewith, or which:—

Figure 1:
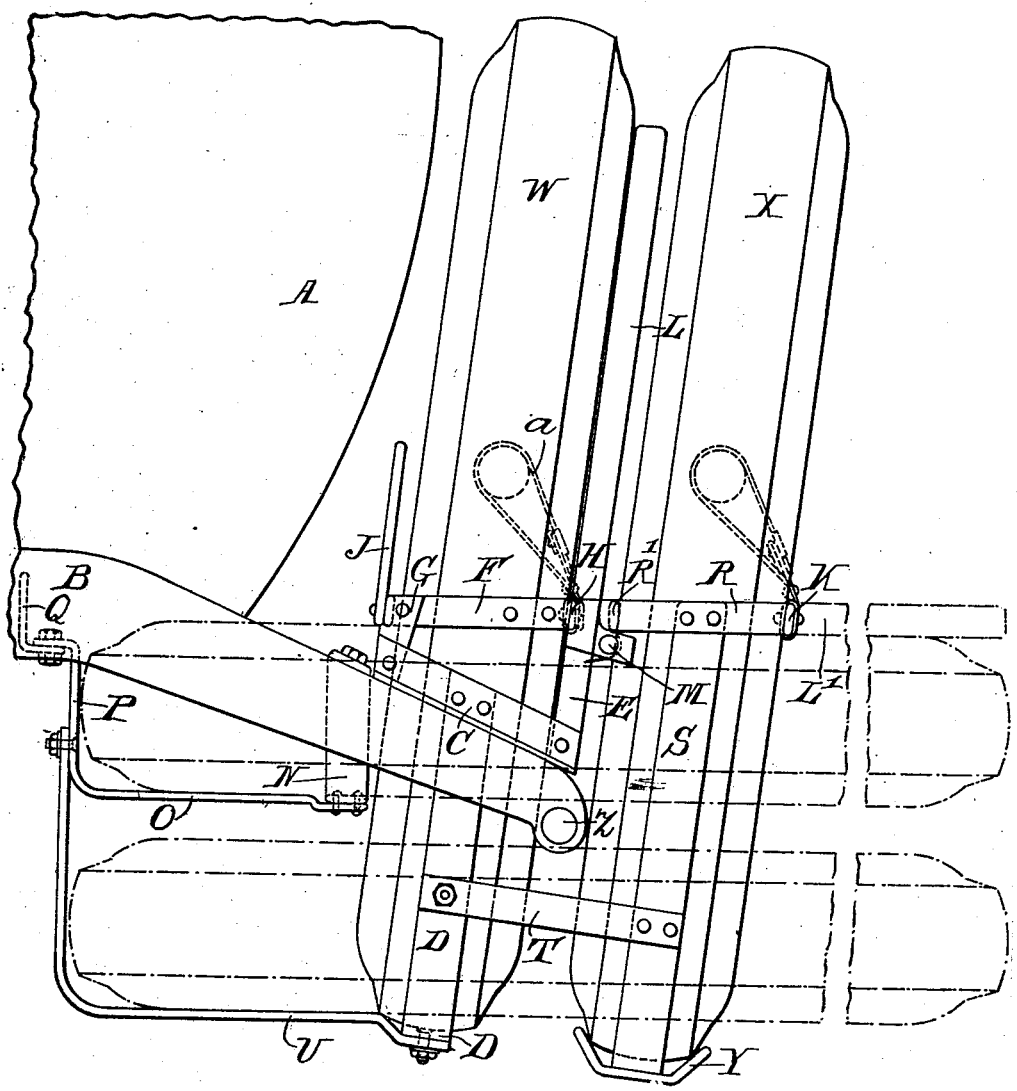
Figure 1 is a side elevation of a device for carrying two spare wheels at the rear of a motor vehicle in accordance with this invention.
Figure 2:
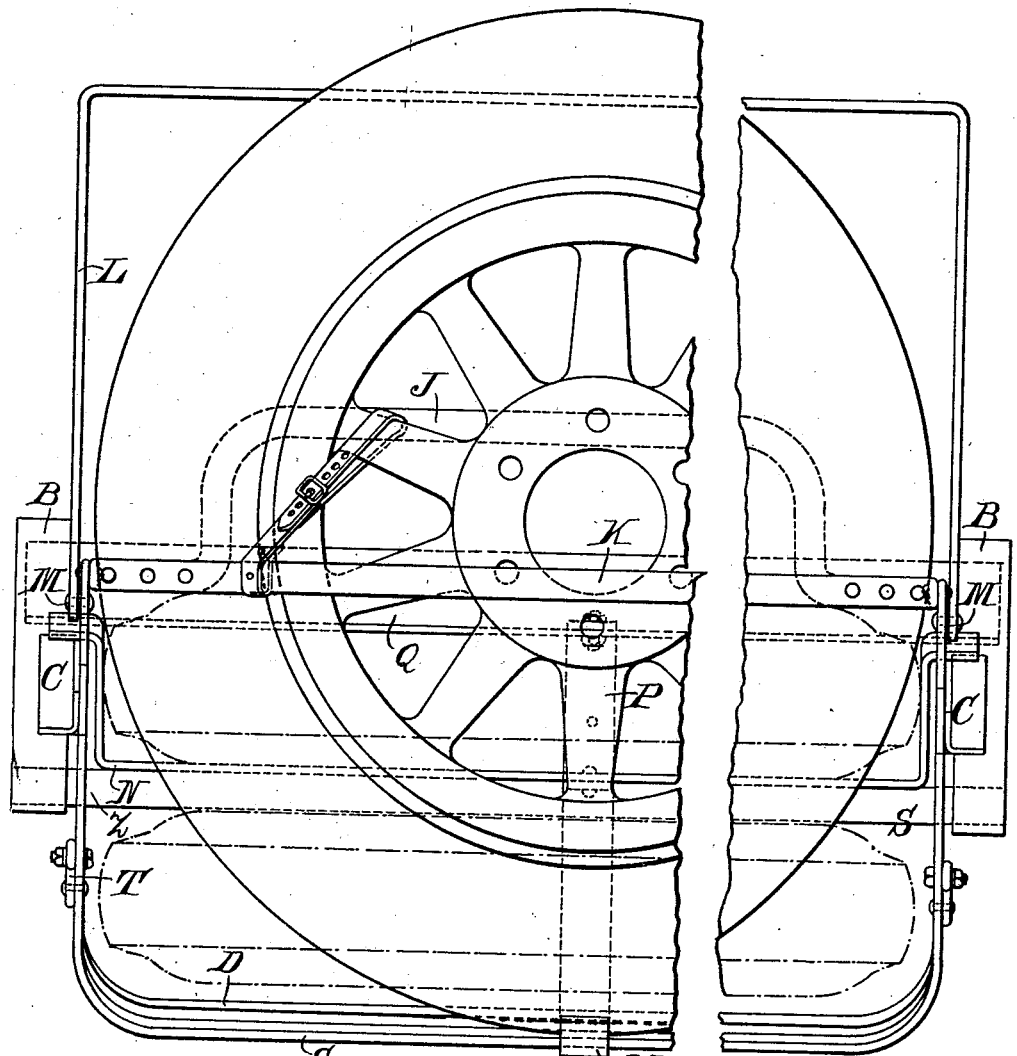
Figure 2 is a rear elevation partly broken away of the device shown in Figure 1.

Referring first to Figures 1 and 2, A is the rear of the vehicle body and B the usual rearwardly extending dumb irons. On each dumb iron and towards the rear end thereof there is riveted a bracket C and riveted to the bracket are the following members, a member D which passes vertically down from the bracket and then horizontally across to the other side where it connects with the other bracket C; an upwardly projecting member E which is riveted at its upper end to a horizontal member F, there being a member F at each side of the vehicle, and a short upwardly projecting member G which at its upper end is also riveted to the member F. The member F on each side is preferably formed in one piece with a transversely extending member H which does not show in Figure 2 because a corresponding transverse member K lies to the rear of it. The forward ends of the members F are riveted to a transverse member J which passes across in front of the wheel when in the vertical position and serves also as a guard to protect the vehicle body from luggage when placed upon the grille. L is a luggage grille pivoted on each side to a lug of the corresponding member E to turn about a pivot centre M so that it can be turned from the position shown in full lines in Figure 1 down to the horizontal position indicated by broken lines at L'. N is a transverse horizontal strip bent at its ends upwardly and outwardly and each outwardly bent portion riveted to the top of the dumb iron on the respective side. O is a horizontal longitudinal central strip riveted to the middle point of the member N and passes forwards along the central line of the vehicle and then vertically upwards at P. It is then bent forwardly and bolted to a transverse angle member Q which is riveted or bolted between side frame members of the chassis.

The member K, already referred to, connects at its ends with two side members R, being preferably in one piece therewith, and these members R, at their forward ends, are riveted to the member H but each is inset slightly at R' so as to form a forward abutment to the second spare wheel or tire. To each member R there is riveted one end of a member S which passes down at each side and horizontally and transversely across underneath the second spare wheel when the latter is in the vertical position, and the member S is connected to the member D by struts T placed one at either side. U is a member which extends forwardly from the middle of the member D to which it is secured at its rearward end and is bent upwardly at its forward end and bolted to the member O.

Assuming that it is not required to carry luggage but that it is required to carry two spare wheels, the luggage grille L is turned up to the position indicated by full lines in Figure 1 and the one wheel W is placed in front of the luggage grille and entered into the receptacle which is formed between the transverse members J and H and the side members F F together with the member D which passes round underneath the wheel. The wheel may be secured in the receptacle by means of a pair of straps $a$ each of which is attached to the member H and is passed round a spoke of the wheel. The other wheel X is entered into the receptacle which is formed between the transverse member K and the inset portions R' and between the longitudinal portions of the members R and the member S. Y is a strip riveted underneath the middle of the strip S to locate the wheel in place.

When it is desired to carry luggage the wheels must be taken out of the vertical receptacles, the luggage grille L turned down to the position L' and the wheels put in the horizontal receptacles. The upper of these is formed by the rearwardly extending member O and the transverse member N with its bent-up ends and by the vertical members E. The spare wheel is retained in this receptacle by straps, not shown, which may pass round the spokes of the wheel and round any suitable transverse or vertical member of the device, for instance the horizontal member H or the ends of the horizontal member J may be utilized for such purpose. The lower receptacle is formed between the members T T and within the members D and S and is closed at its forward end by the member U which also forms an underneath support for the front of the wheel. The wheel may be secured in position by straps passing round its spokes and round a convenient transverse member such for instance as the usual bar Z which connects the rear ends of the dumb irons together, or the lower spare wheel may be strapped to the upper.

If it is desired to carry only a single spare wheel the members U, T, S and R can be readily detached but the member U is useful to steady the member D.

Figure 3:
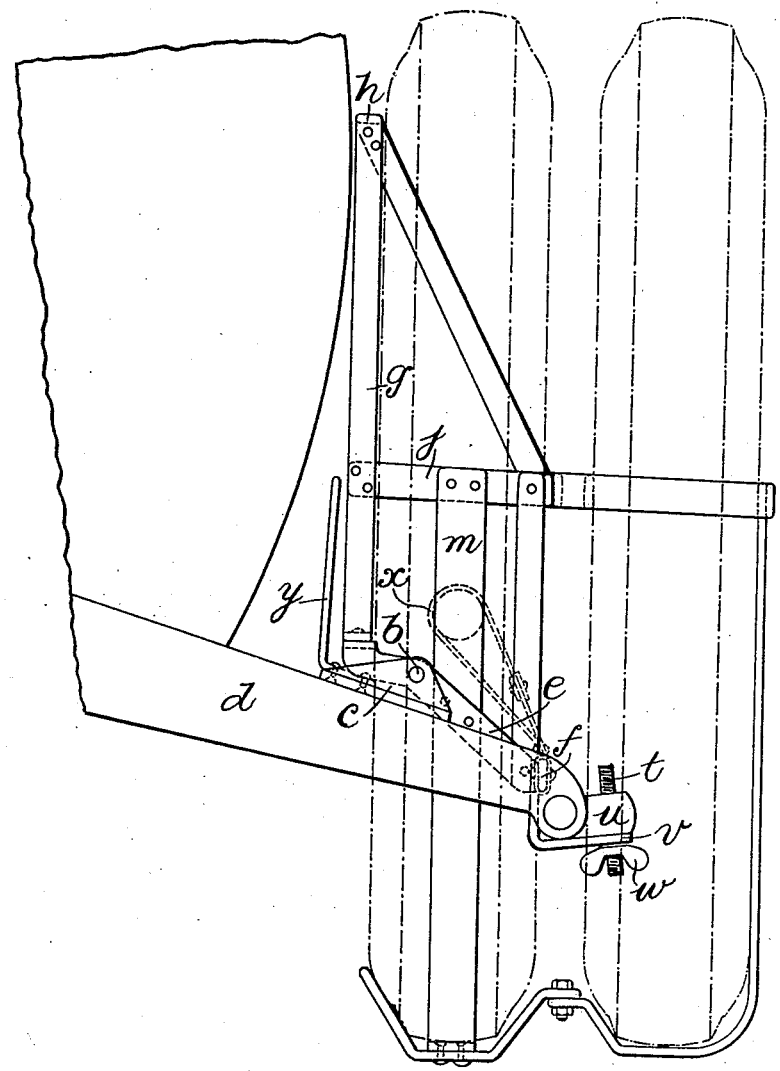
Figure 3 is a side elevation of a modification of the invention showing a pivoted receptacle in a substantially vertical position, and showing also an additional receptacle secured thereto.
Figure 4:
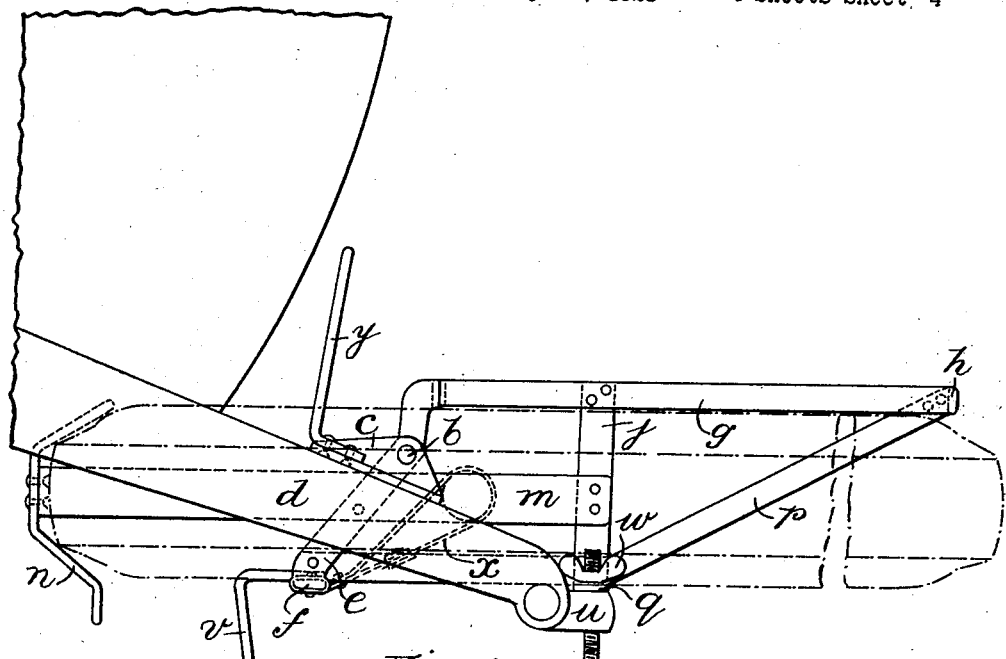
Figure 4 is a view corresponding to Figure 3 except that the additional receptacle is omitted and showing the main receptacle in its horizontal position; and, Figure 5 is a rear view of the receptacle in the position shown in Figure 4.
Figure 5:
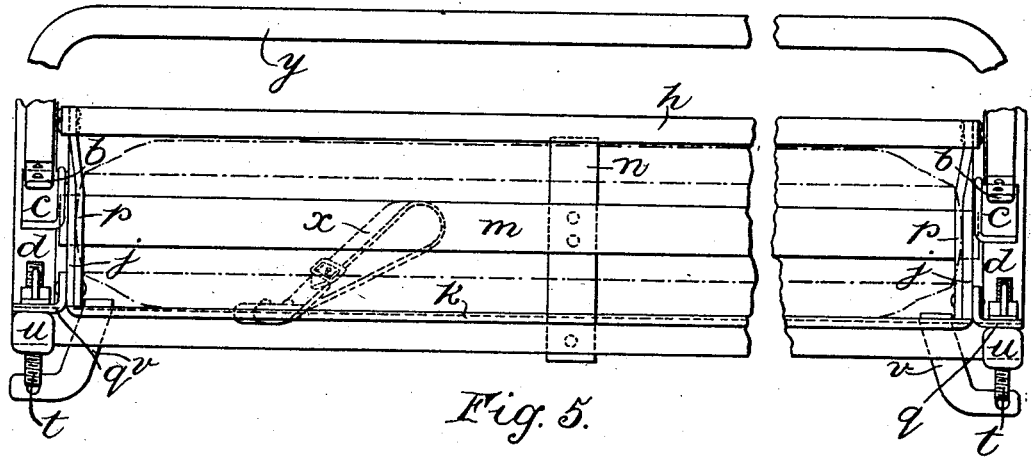

Referring to Figures 3, 4 and 5, only a single receptacle is shown, except in Figure 3, and the main receptacle is pivoted to turn about the pivot axis $b$ of a pair of brackets $c$ $c$, each of which is riveted upon the top of the respective dumb iron $d$. The receptacle comprises a pair of members $e$ $e$ one at each side each being pivoted to its respective bracket $c$. These members $e$ $e$ are formed in one piece with a transverse member $f$ which passes across and forms a part of the bottom of the receptacle when the latter is in its horizontal position (see Figure 4). Riveted at its ends to each member $e$ is a member $g$ which passes rearwardly therefrom when in the horizontal position (see Figure 4) and is connected across transversely to the other side by a member *h*, the members *g* and *h* together forming the luggage grille as well as forming the upper boundary of the receptacle when in the horizontal position. Connected to an intermediate point of each member *g* is a member *j* which is vertical in Figure 4, and these two members extend downwards and are connected across by a transverse member *k* (not shown in Figure 4) with which they may be in one piece, and the member *k* forms a second bottom member for the receptacle when in the horizontal position. To the middle of the height of each member *j* there is riveted one end of a member *m* which passes forwardly at either side of the spare wheel and across the front thereof, and to about the middle of the member *m* there is riveted a member *n* to keep the forward part of the wheel in place. *p p* are a pair of slanting struts connecting between the outer end of each member *g* and the lower end of each member *j*. *q q* are a pair of brackets each riveted against the outer face of the corresponding member *j* and having a hole so arranged that, (when the receptacle is in the horizontal position), it comes from above, over an upwardly and downwardly extending stud *t* which is carried by a boss *u* secured to the respective dumb iron *d*. *v v* are two brackets each riveted to a member *f* and each having a hole to pass over the stud *t* from underneath when the receptacle is in the vertical position, and the receptacle is secured in either of its two positions by means of wing nuts *w*. The wheel is secured in the receptacle by means of a pair of straps *x* secured to the member *f* and each passing round a spoke of the wheel. *y* is a guard rail riveted at its ends to the brackets *c c* and serving to guard the body of the vehicle from the luggage which is carried on the grille.

Normally the spare wheel is carried in the position indicated in Figure 3; but, when it is desired to carry luggage, the wing nut *w* is removed and the receptacle containing the spare wheel is swung down to the position shown in Figure 4 when the brackets *q* pass over the upper ends of the studs *t* after which the wing nuts *w* are screwed on to secure the receptacle.

The wheel, when in the horizontal position, lies forwards against the member *m* and downwards upon the members *f* and *k* while it is kept from upward movement by the transverse portion of the member *g*.

A second spare wheel or spare tire can if desired be carried in this case also as indicated in Figure 3 an additional receptacle being provided for such purpose secured to the pivoted receptacle by bolting it to the members *j j* and *n* and also to *f* if desired.

It will be seen that with both the constructions described above, the spare wheels or spare tires can normally be carried vertically close up against the back of the vehicle, and can be moved down to the horizontal position when it is required to carry luggage, and that the luggage, in such case, does not project any further to the rear than is normally the case.

Having fully described my invention, what I claim and desire to secure by Letters Patent is:—

1. Means for carrying a spare wheel or spare tire at the rear of a motor vehicle comprising a two-part receptacle one part of said receptacle being substantially horizontal with an opening at the rear, and the other part of said receptacle being substantially vertical with an opening at the top, the wheel or tire when in the vertical part of said receptacle cutting across the space it occupies when in the horizontal part of said receptacle.

2. Means for carrying a spare wheel or spare tire at the rear of a motor vehicle comprising a two-part receptacle, one part of said receptacle being substantially horizontal with an opening at the rear and the other part of said receptacle being substantially vertical with an opening at the top, the wheel or tire when in the vertical part of said receptacle cutting across the space it occupies when in the horizontal part of said receptacle and a further receptacle for carrying a further spare wheel or tire placed against the rear face of the substantially vertical part of said receptacle.

3. Means for carrying a spare wheel or spare tire at the rear of a motor vehicle comprising a two-part receptacle one part of said receptacle being horizontal with an opening at the rear and the other part of said receptacle being substantially vertical with an opening at the top, the wheel or tire when in the vertical part of said receptacle cutting across the space it occupies when in the horizontal part of said receptacle and a further receptacle for carrying a further spare wheel or tire placed against the under face of the horizontal part of said receptacle.

4. Means for carrying a spare wheel or spare tire at the rear of a motor vehicle comprising a two-part receptacle one part of said receptacle being substantially horizontal with an opening at the rear and the other part of said receptacle being substantially vertical with an opening at the top, the wheel or tire when in the vertical part of said receptacle cutting across the space it occupies when in the horizontal part of said receptacle, and a luggage grille forming the top of the horizontal part of said receptacle and adapted to be turned up to a substantially vertical position when the spare wheel or tire is placed in the substantially vertical part of said receptacle.

5. Means for carrying a spare wheel or spare tire at the rear of a motor vehicle, comprising a two-part receptacle, one-part of said receptacle being substantially horizontal with an opening at the rear and the other part of said receptacle being substantially vertical with an opening at the top, the wheel or tire when in the vertical part of said receptacle cutting across the space it occupies when in the horizontal part of said receptacle brackets for carrying said two-part receptacle mounted one on each dumb iron at the rear of the vehicle, and a cross member at the rear of the vehicle, to an intermediate point of which, said two-part receptacle is connected.

In witness whereof I have hereunto signed my name this 22nd day of June, 1928.

HERBERT AUSTIN.